UNITED STATES PATENT OFFICE 2,647,906

2-(HALO-PHENYL)-4-THIAZOLIDONE-1-DI-OXIDES AND THEIR PREPARATION

Alexander R. Surrey, Albany, N. Y., assignor to Sterling Drug Inc., New York, N. Y., a corporation of Delaware No Drawing. Application July 5, 1952,
Serial No. 297,413

16 Claims. (Cl. 260—301)

This invention relates to 2 - (halogenated-phenyl)-4-thiazolidone-1-dioxides and to their preparation.

The compounds of my invention have the following structure

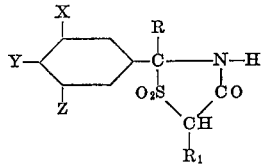

where X, Y and Z are each a member of the group consisting of hydrogen and halogen, at least one of X, Y and Z being halogen, and R and $R_1$ are each a member of the group consisting of hydrogen and a lower alkyl radical. X, Y and Z when representing halogen can be chloro, bromo, iodo or fluoro and can be the same or different. R and $R_1$ when representing lower alkyl radicals have preferably from one to six carbon atoms, including radicals such as methyl, ethyl, n-propyl, n-butyl, isobutyl, isoamyl, n-hexyl, 3-hexyl, and the like.

The 2-(halogenated-phenyl)-4-thiazolidone-1-dioxides of my invention are useful for their chemotherapeutic properties, for instance, amoebacidal properties.

I prepared my 2-(halogenated-phenyl)-4-thiazolidone-1-dioxides by treating the corresponding 2-(halogenated-phenyl)-4-thiazolidones with an oxidizing agent effective to oxidize sulfides to sulfones. This oxidation reaction can be carried out using various oxidizing agents under a variety of conditions. In practicing my invention, I ran the reaction preferably within the temperature range of about 15 to 35° C. using, as the oxidizing agent, potassium permanganate, in an aqueous acetic acid reaction medium. However, these preferred reaction conditions are not critical. For instance, temperatures below and above the preferred range can be used but usually with decreased yields of the desired product. Other oxidizing agents can be employed, e. g., per-compounds such as hydrogen peroxide, peracetic acid or other per-acids, chromium trioxide ($CrO_3$) and other oxidizing agents known to the chemist; in general, these oxidizing agents are selected from the class consisting of compounds of hepta-valent manganese, hexavalent chromium and per-compounds, as illustrated above. Other reaction media, depending on the particular oxidizing agent used, can be employed. These variants in reaction conditions are obvious and their choice is within the skill of the chemist.

Illustrative of my process of preparing the 2-(halogenated-phenyl)-4-thiazolidone-1 - dioxides is the formation of 2-(3,4-dichlorophenyl)-4-thiazolidone-1-dioxide by treating 2-(3,4-dichlorophenyl)-4-thiazolidone with aqueous potassium permanganate.

The intermediate 2-(halogenated-phenyl)-4-thiazolidones were prepared by heating a mixture of the appropriate halogenated aldehyde or ketone, a 2-mercaptoalkanoic acid or a lower alkyl ester thereof and ammonia or an ammonium salt that produces ammonia on heating. The preferred method was by heating in an inert solvent, such as benzene, dioxane or pyridine, a mixture of ammonium carbonate, a 2-mercaptoalkanoic acid having the formula, $HSCHR_1COOH$, and the appropriate aldehyde or ketone having the structure

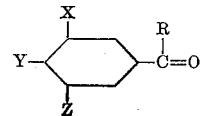

where X, Y, Z, R and $R_1$ have the meanings given above. Instead of ammonium carbonate, other salts of ammonia, preferably those with weak inorganic or organic acids, that decompose readily when heated to produce ammonia can be used, e. g., ammonium acetate was found satisfactory. Alternatively, ammonia can be used directly, for example, a solution of ammonia in methanol was found to produce satisfactory results. Still another procedure found useful was the heating of said aldehyde or ketone of the above formula with the ammonium salt of said 2-mercaptoalkanoic acid. Another variation found operable was the substitution in the reaction of the 2-mercaptoalkanoic acid by a lower alkyl ester thereof, said lower alkyl radical having from 1–6 carbon atoms and preferably being methyl. Illustrations of these various procedures are as follows: 2-(4-chlorophenyl)-2-methyl-4-thiazolidone by heating a mixture of ammonium carbonate, thioglycolic acid and 4-chloroacetophenone in dioxane; 2-(3,4,5-tribromophenyl)-5-methyl-4-thiazolidone by heating a mixture of ammonium acetate, 3,4,5-tribromobenzaldehyde and 2-mercaptopropanoic acid in benzene; 2-(3-iodo-5-bromophenyl)-4-thiazolidone by heating ammonium thioglycolate with 3-iodo-5-bromobenzaldehyde in benzene; and 2-(3,4-dichlorophenyl)-4-thiazolidone by heating a mixture of ammonium carbonate, 3,4-dichlorobenzaldehyde and methyl thioglycolate in benzene or dioxane.

The preparation of the intermediate 2-(halogenated-phenyl)-4-thiazolidones was carried out preferably in anhydrous medium, having a continuous separator connected to the apparatus to remove water as it is formed by the reaction. However, use of the anhydrous conditions and the continuous separator is not necessary since the reaction will proceed in the presence of water, although the yield may be less in some instances.

The following examples will further illustrate specific embodiments of my invention.

EXAMPLE 1

A. 2-(3,4-dichlorophenyl)-4-thiazolidone

A mixture of 35 g. of 3,4-dichlorobenzaldehyde, 12 g. of ammonium carbonate, 15 ml. of thioglycolic acid and 300 ml. of dry benzene was boiled for eight hours under a condenser and water separator so arranged as to collect the water formed while returning the benzene layer to the reaction vessel. At the end of this time, about 8 ml. of water had been collected. The reaction mixture was poured with stirring into 200 ml. of water containing 15 ml. of concentrated ammonium hydroxide, whereupon the product separated. A small amount of ethanol was added to facilitate filtration and the product was collected, stirred in warm water and collected again; yield, 34 g. Recrystallization from ethanol gave 19.5 g. of the product, 2-(3,4-dichlorophenyl)-4-thiazolidone, melting at 205.8–207° C. (cor.).

Anal.: Calcd. for $C_9H_7Cl_2NOS$: S, 12.92; Cl, 25.58. Found: S, 12.96; Cl, 28.80.

Following the procedure described above but using the appropriate halogenated-benzaldehyde in place of 3,4-dichlorobenzaldehyde, the following 2-(halogenated-phenyl)-4-thiazolidones can be obtained: 2-(3,4-dibromophenyl)-4-thiazolidone from 3,4-dibromobenzaldehyde; 2-(3,5-dichlorophenyl)-4-thiazolidone from 3,5-dichlorobenzaldehyde; 2-(3,4-diiodophenyl)-4-thiazolidone from 3,4-diiodobenzaldehyde; 2-(3,4,5-trichlorophenyl)-4-thiazolidone from 3,4,5-trichlorobenzaldehyde; 2-(3,4-difluorophenyl)-4-thiazolidone from 3,4-difluorobenzaldehyde; and 2-(3-chloro-4-bromophenyl)-4-thiazolidone from 3-chloro-4-bromobenzaldehyde.

B. 2-(3,4-dichlorophenyl)-4-thiazolidone-1-dioxide

To a solution of 8 g. of 2-(3,4-dichlorophenyl)-4-thiazolidone in 200 ml. of acetic acid was added dropwise with stirring, below 30° C., a solution of 7.5 g. of potassium permanganate in 75 ml. of water. After the addition had been completed, aqueous sodium bisulfite solution was added to the reaction mixture to dissolve the manganese dioxide. The mixture was diluted with an equal volume of water and the colorless product was collected, washed thoroughly with water and dried. The yield of product, 2-(3,4-dichlorophenyl)-4-thiazolidone-1-dioxide, melting at 192.4–193.4° C. (cor.) was 7.5 g. (83%).

Anal.: Calcd. for $C_9H_7Cl_2NO_3S$: Cl, 25.31; S, 11.45. Found: Cl, 25.30; S, 11.49.

The above product, 2-(3,4-dichlorophenyl)-4-thiazolidone-1-dioxide, was found to be an effective amoebacidal agent when tested in vivo against *Endamoeba criceti* in the intestine of the hamster.

When the above precedure is followed but using other 2-(halogenated-phenyl)-4-thiazolidones in place of 2-(3,4-dichlorophenyl)-4-thiazolidone, the following 2-(halogenated-phenyl)-4-thiazolidone-1-dioxides can be obtained: 2-(3,4-dibromophenyl)-4-thiazolidone-1-dioxide; 2-(3,5-dichlorophenyl)-4-thiazolidone-1-dioxide; 2-(3,4-diiodophenyl)-4-thiazolidone-1-dioxide; 2-(3,4,5-trichlorophenyl)-4-thiazolidone-1-dioxide; 2-(3,4-difluorophenyl)-4-thiazolidone-1-dioxide; and 2-(3-chloro-4-bromophenyl)-4-thiazolidone-1-dioxide.

EXAMPLE 2

A. 2-(4-chlorophenyl)-4-thiazolidone

A solution of 15 ml. (20 g.) of thioglycolic acid in 300 ml. of dry benzene was treated with a solution of ammonia in methanol till alkaline to litmus and 28.1 g. of 4-chlorobenzaldehyde was added immediately. After the methanol had been removed by distillation, the remaining solution was refluxed for three hours in a flask adapted with a continuous separator and a drying tube, after which time a total of 7.0 ml. of water had been removed. The reaction mixture was cooled and washed with water containing 10 ml. of concentrated ammonium hydroxide. The solid that separated was collected and washed with water. This material melted at 162–164° C. Another 3 g. of this material (M. P. 162–164° C.) was obtained by concentrating the benzene solution to about 150 ml. and allowing it to cool. The total amount of 20.5 g. (48%) of this material was recrystallized, with charcoaling, from absolute ethanol, yielding about 19 g. of white, tiny platelets, M. P. 165.4–166.2° C. (cor.) when dried at 95° C. for four hours.

Anal.: Calcd. for $C_9H_8ClNOS$: N, 6.56; S, 15.00. Found: N, 6.53; S, 15.04.

The above precedure can be carried out but using dioxane in place of benzene as the solvent, without removal of the water from the reaction mixture; also, methyl thioglycolate can be used in place of thioglycolic acid.

When the above procedure is followed but using the appropriate halobenzaldehyde in place of 4-chlorobenzaldehyde, there can be obtained the following compounds: 2-(4-iodophenyl)-4-thiazolidone, 2-(4-fluorophenyl)-4-thiazolidone, and 2-(3-chlorophenyl)-4-thiazolidone.

B. 2-(4-chlorophenyl)-4-thiazolidone-1-dioxide

To a solution of 15.5 g. of 2-(4-chlorophenyl)-4-thiazolidone in 150 ml. of acetic acid at about 15° C. was added dropwise, with stirring, over a period of about one hour a solution of 21 g. of potassium permanganate in 400 ml. of water. Sodium bisulfite solution was then added to the reaction mixture to dissolve the precipitated manganese dioxide. The resulting solution was chilled and the solid (14.4 g.) that separated was collected. This solid was recrystallized from nitromethane, with charcoaling, yielding 2-(4-chlorophenyl)-4-thiazolidone-1-dioxide, M. P. 172–173.5° C. with decomposition.

Anal.: Calcd. for $C_9H_8ClNO_3S$: N, 5.70; S, 13.05. Found: N, 5.86; S, 13.08.

The above product, 2-(4-chlorophenyl)-4-thiazolidone-1-dioxide, was found to be an effective amoebacidal agent when tested in vivo against *Endamoeba criceti* in the intestine of the hamster.

Following the above procedure but using the appropriate 2-(halophenyl)-4-thiazolidone in place of 2-(4-chlorophenyl)-4-thiazolidone, the following 2-(halophenyl)-4-thiazolidone-1-dioxides can be obtained: 2-(4-iodophenyl)-4-thiazolidone-1-dioxide, 2-(4-fluorophenyl)-4-thiazolidone-1-dioxide, and 2-(3-chlorophenyl)-4-thiazolidone-1-dioxide.

EXAMPLE 3

A. *2-(4-chlorophenyl)-5-ethyl-4-thiazolidone*

A mixture of 14.05 g. of 4-chlorobenzaldehyde, 6.0 g. of ammonium carbonate, 12.5 g. of 2-mercaptobutanoic acid and 125 ml. of dry benzene was refluxed for one hour with a continuous separator connected to the apparatus. The reaction proceeded rapidly with all of the water having been collected after about thirty minutes. The reaction mixture was cooled after the one hour reflux period and was extracted with water containing 10 ml. of concentrated ammonium hydroxide. The benzene layer was dried over anhydrous calcium sulfate, decolorizing charcoal added and the resulting mixture filtered. Vacuum evaporation of the benzene yielded a light yellow solid which was slurried with n-pentane and filtered. This solid was recrystallized, with charcoaling, from about 300 ml. of n-heptane yielding 10 g. of white fluffy crystalline product, 2-(4-chlorophenyl)-5-ethyl-4-thiazolidone, M. P. 123.5–124.2° C. (cor.), when dried at 90° C. for three hours.

Anal.: Calcd. for $C_{11}H_{12}ClNOS$: N, 5.80; S, 13.26. Found: N, 5.96; S, 13.28.

When the above procedure is followed but using other halogenated-benzaldehydes and 2-mercaptoalkanoic acids in place of 4-chlorobenzaldehyde and 2-mercaptobutanoic acid, respectively, the following 2-(halogenated-phenyl)-5-alkyl-4-thiazolidones can be obtained: 2-(4-chlorophenyl)-5-methyl-4-thiazolidone from 4-chlorobenzaldehyde and 2-mercaptopropanoic acid; 2-(4-chlorophenyl)-5-n-butyl-4-thiazolidone from 4-chlorobenzaldehyde and 2-mercaptohexanoic acid; 2-(3,4-dichlorophenyl)-5-ethyl-4-thiazolidone from 3,4-dichlorobenzaldehyde and 2-mercaptobutanoic acid; 2-(4-iodophenyl)-5-ethyl-4-thiazolidone from 4-iodobenzaldehyde and 2-mercaptobutanoic acid; and 2-(3-bromophenyl)-5-methyl-4-thiazolidone from 3-bromobenzaldehyde and 2-mercaptopropanoic acid.

B. *2-(4-chlorophenyl)-5-ethyl-4-thiazolidone-1-dioxide*

This preparation can be carried out following the procedure described above for Example 1B but using 2-(4-chlorophenyl)-5-ethyl-4-thiazolidone in place of 2-(3,4-dichlorophenyl)-4-thiazolidone. The product is 2-(4-chlorophenyl)-5-ethyl-4-thiazolidone-1-dioxide.

Following the above procedure but using other 2-(halogenated-phenyl)-5-alkyl-4-thiazolidones in place of 2-(4-chlorophenyl)-5-ethyl-4-thiazolidone, the following products can be obtained: 2-(4-chlorophenyl)-5-methyl-4-thiazolidone-1-dioxide; 2-(4-chlorophenyl)-5-n-butyl-4-thiazolidone-1-dioxide; 2-(3,4-dichlorophenyl)-5-ethyl-4-thiazolidone-1-dioxide; 2-(4-iodophenyl)-5-ethyl-4-thiazolidone-1-dioxide; and 2-(3-bromophenyl)-5-methyl-4-thiazolidone-1-dioxide.

EXAMPLE 4

A. *2-(4-chlorophenyl)-2-methyl-4-thiazolidone*

A mixture of 31 g. of 4-chloroacetophenone, 15 ml. of thioglycolic acid, 12 g. of ammonium carbonate and 300 ml. of benzene was refluxed for fifty-six hours with a continuous separator connected to the apparatus. The benzene solution was washed with dilute ammonium hydroxide solution and then with water. Removal of the benzene in vacuo left an oil which was dissolved in warm n-heptane. Upon cooling and scratching, there separated about 14 g. of crystalline product, 2-(4-chlorophenyl)-2-methyl-4-thiazolidone, M. P. 99–105° C. Two recrystallizations from n-heptane raised the melting to 110.2–111.2° C. (cor.).

Anal.: Calcd. for $C_{10}H_{10}ClNOS$: Cl, 15.57; S, 14.08. Found: Cl, 15.48; S, 14.08.

When the above procedure is followed but using other halogenated-phenyl alkyl ketones in place of 4-chloroacetophenone, the following 2-(halogenated-phenyl)-2-alkyl-4-thiazolidones can be obtained: 2-(3,4-dichlorophenyl)-2-methyl-4-thiazolidone from 3,4-dichloroacetophenone; 2-(3,4-dibromophenyl)-2-methyl-4-thiazolidone from 3,4-dibromoacetophenone; 2-(4-chlorophenyl)-2-ethyl-4-thiazolidone from 4-chloropropiophenone; 2-(4-iodophenyl)-3-n-propyl-4-thiazolidone from 4-iodobutyrophenone.

When the above procedure is followed but using 2-mercaptobutanoic acid in place of thioglycolic acid, the resulting product obtained is 2-(4-chlorophenyl)-2-methyl-5-ethyl-4-thiazolidone.

B. *2-(4-chlorophenyl)-2-methyl-4-thiazolidone-1-dioxide*

A solution of 22.5 g. of potassium permanganate in 200 ml. of water was added slowly with stirring to a solution of 20 g. of 2-(4-chlorophenyl)-2-methyl-4-thiazolidone in 250 ml of glacial acetic acid. The temperature of the reaction mixture was kept at about 20° C. with external cooling. After the addition had been completed, the mixture was stirred for one hour at room temperature and an excess of sodium bisulfite solution was added. After adding an equal volume of water, the tan product was collected and washed with water; yield, 15.5 g. Recrystallization from methanol gave 7 g. of the product, 2-(4-chlorophenyl)-2-methyl-4-thiazolidone-1-dioxide, melting at 145.7–146.8° C. (cor.).

Anal.: Calcd. for $C_{10}H_{10}ClNO_3S$: Cl, 13.65; S, 12.35. Found: Cl, 13.62; S, 12.42.

Other 2-(halogenated-phenyl)-2-alkyl-4-thiazolidone-1-dioxides that can be prepared following the above procedure but using other 2-(halogenated-phenyl)-2-alkyl-4-thiazolidones in place of 2-(4-chlorophenyl)-2-methyl-4-thiazolidone include the following: 2-(3,4-dichlorophenyl)-2-methyl-4-thiazolidone-1-dioxide, 2-(3,4-dibromophenyl)-2-methyl-4-thiazolidone-1-dioxide, 2-(4-chlorophenyl)-2-ethyl-4-thiazolidone-1-dioxide, 2-(4-iodophenyl)-3-n-propyl-4-thiazolidone-1-dioxide, and 2-(4-chlorophenyl)-2-methyl-5-ethyl-4-thiazolidone-1-dioxide.

EXAMPLE 5

A. *2-(4-bromophenyl)-4-thiazolidone*

When the procedure described above for Example 1A was followed but using 27.8 g. of 4-bromobenzaldehyde, 9 g. of ammonium carbonate, 12 ml. of thioglycolic acid and 300 ml. of dry benzene, and a reflux period of twelve hours, there was obtained about 15 g. of product before recrystallization. Recrystallization from ethylene dichloride, with charcoaling, gave 12 g. of the purified product, 2-(4-bromophenyl)-4-thiazolidone, melting at 176.3–177.7° C. (cor.).

Anal.: Calcd. for C₉H₈BrNOS; S, 12.42; Br, 30.95. Found: S, 12.41; Br, 31.05.

Following the above procedure but substituting 3-bromobenzaldehyde for the 4-bromo isomer, the resulting product is 2-(3-bromophenyl)-4-thiazolidone.

B. 2-(4-bromophenyl)-4-thiazolidone-1-dioxide

When the procedure described above in Example 1B was followed but using 17 g. of 2-(4-bromophenyl)-4-thiazolidone in 300 ml. of acetic acid and 18.3 g. of potassium permanganate in 150 ml. of water, there was obtained about 8 g. of product, 2-(4-bromophenyl)-4-thiazolidone-1-dioxide, M. P. 196.2–196.6° C. (cor.), when recrystallized from nitromethane.

Anal.: Calcd. for C₉H₈BrNO₃S: Br, 27.55; S, 11.05. Found: Br, 27.10; S, 11.08.

The above product, 2-(4-bromophenyl)-4-thiazolidone-1-dioxide, was found to be an effective amoebacidal agent when tested in vivo against *Endamoeba criceti* in the intestine of the hamster.

Substitution of 2-(3-bromophenyl)-4-thiazolidone for 2-(4-bromophenyl)-4-thiazolidone in the foregoing preparation results in the formation of 2-(3-bromophenyl)-4-thiazolidone-1-dioxide.

EXAMPLE 6

A. Ammonium thioglycolate

To a solution of 56 ml. of redistilled thioglycolic acid dissolved in 500 ml. of dry benzene was added methanolic ammonia until the reaction mixture was alkaline to litmus. The excess ammonia was then removed in vacuo. The crystalline solid that separated was filtered, washed twice with absolute ether and dried by suction. There was obtained about 100 g. of ammonium thioglycolate as a yellow powder. This material was used without further purification in part B below.

B. 2-(4-chlorophenyl)-4-thiazolidone

A mixture of 28.1 g. of 4-chlorobenzaldehyde, 23 g. of ammonium thioglycolate and 250 ml. of dry benzene was refluxed for three hours with a continuous separator connected to the apparatus. At the end of this time the theoretical quantity of water had been collected. The reaction mixture was cooled and washed with aqueous sodium hydroxide solution, whereupon a solid separated. This solid was collected, washed with water and recrystallized from benzene with charcoaling, yielding about 7.5 g. of 2-(4-chlorophenyl)-4-thiazolidone, M. P. 162–164° C. This product was purified as in Example 2A.

Other 2-(halogenated-phenyl)-4-thiazolidones can be prepared according to the above procedure by substituting the appropriate halogenated-benzaldehyde or halophenyl alkyl ketone in place of 4-chlorobenzaldehyde, e. g., 2-(3,4-dichlorophenyl)-4-thiazolidone can be obtained from 3,4-dichlorobenzaldehyde and 2-(4-chlorophenyl)-2-methyl-4-thiazolidone, from 4-chloroacetophenone.

C. 2-(4-chlorophenyl)-4-thiazolidone-1-dioxide

Oxidation of 2-(4-chlorophenyl)-4-thiazolidone, prepared in Example 6B, following the procedure described in Example 2B results in the formation of 2-(4-chlorophenyl)-4-thiazolidone-1-dioxide, M. P. 172–173.5° C. with decomposition.

I claim:

1. A 2-(halogenated-phenyl)-4-thiazolidone-1-dioxide having the structure

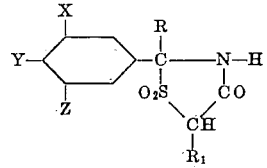

where X, Y and Z are each a member of the group consisting of hydrogen and halogen, at least one of X, Y and Z being halogen, and R and R₁ are each a member of the group consisting of hydrogen and a lower alkyl radical.

2. A 2-(4-halophenyl)-4-thiazolidone-1-dioxide having the structure

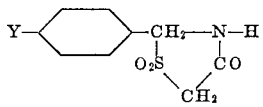

where Y is halogen.

3. A 2-(4-halophenyl)-2-(lower alkyl)-4-thiazolidone-1-dioxide having the structure

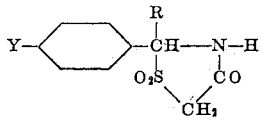

where Y is halogen and R is a lower alkyl radical.

4. A 2-(3,4-dihalophenyl)-4-thiazolidone-1-dioxide having the structure

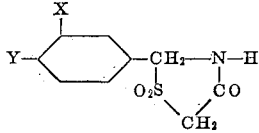

where X and Y are each halogen.

5. 2-(4-chlorophenyl)-4-thiazolidone-1-dioxide.

6. 2-(4-bromophenyl)-4-thiazolidone-1-dioxide.

7. 2-(4-chlorophenyl)-2-methyl-4-thiazolidone-1-dioxide.

8. 2-(3,4-dichlorophenyl)-4-thiazolidone-1-dioxide.

9. The process for the preparation of a 2-(halogenated-phenyl)-4-thiazolidone-1-dioxide having the structure

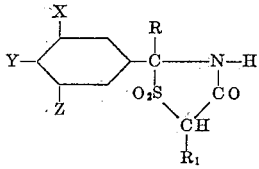

where X, Y and Z are each a member of the group consisting of hydrogen and halogen, at least one of X, Y and Z being halogen, and R and R₁ are each a member of the group consisting of hydrogen and a lower alkyl radical, which comprises treating the corresponding 2-(halogenated-phenyl)-4-thiazolidone with an oxidizing agent effective to oxidize sulfides to sulfones.

10. A process for the prepartion of a 2-(4-halophenyl)-4-thiazolidone-1-dioxide having the structure

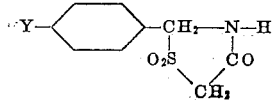

where Y is halogen, which comprises treating the corresponding 2-(4-halophenyl)-4-thiazolidone with an oxidizing agent effective to oxidize sulfides to sulfones.

11. A process for the preparation of a 2-(4-halophenyl) - 2 - (lower alkyl) - 4 - thiazolidone-1-dioxide having the structure

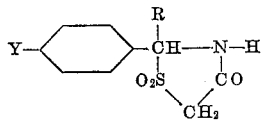

where Y is halogen and R is a lower alkyl radical, which comprises treating the corresponding 2-(4-halophenyl)-2-(lower alkyl)-4-thiazolidone with an oxidizing agent effective to oxidize sulfides to sulfones.

12. A process for the preparation of 2-(3,4-dihalophenyl)-4-thiazolidone-1-dioxide having the structure

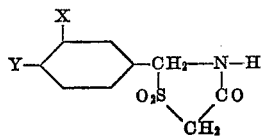

where X and Y are each halogen, which comprises treating the corresponding 2-(3,4-dihalophenyl)-4-thiazolidone with an oxidizing agent effective to oxidize sulfides to sulfones.

13. A process for the preparation of 2-(4-chlorophenyl) - 4 - thiazolidone - 1 - dioxide which comprises treating 2-(4-chlorophenyl)-4-thiazolidone with an oxidizing agent effective to oxidize sulfides to sulfones.

14. A process for the preparation of 2-(4-bromophenyl) - 4 - thiazolidone - 1 - dioxide which comprises treating 2-(4-bromophenyl)-4-thiazolidone with an oxidizing agent effective to oxidize sulfides to sulfones.

15. A process for the preparation of 2-(4-chlorophenyl) - 2 - methyl - 4 - thiazolidone - 1-dioxide which comprises treating 2-(4-chlorophenyl)-2-methyl-4-thiazolidone with an oxidizing agent effective to oxidize sulfides to sulfones.

16. A process for the preparation of 2-(3,4-dichlorophenyl)-4-thiazolidone-1-dioxide which comprises treating 2 - (3,4 - dichlorophenyl)-4-thiazolidone with an oxidizing agent effective to oxidize sulfides to sulfones.

ALEXANDER R. SURREY.

No references cited.